United States Patent [19]
Raasch et al.

[11] Patent Number: 5,802,639
[45] Date of Patent: Sep. 8, 1998

[54] VARIABLE FORCE CLUTCH FOR LINEAR ACTUATOR

[75] Inventors: Jason J. Raasch, Wheeling; Andrey E. Frolov, Glenview, both of Ill.

[73] Assignee: Midwest Air Technologies, Inc., Lincolnshire, Ill.

[21] Appl. No.: 741,386

[22] Filed: Oct. 29, 1996

[51] Int. Cl.[6] .............................. A61G 7/012; F16H 27/02
[52] U.S. Cl. ................................. 5/611; 5/616; 74/89.15
[58] Field of Search ................................ 5/11, 611, 616; 74/89.15, 424.8 A; 192/8 A

[56] References Cited

U.S. PATENT DOCUMENTS

| | | |
|---|---|---|
| 964,752 | 7/1910 | Cartwright . |
| 2,944,436 | 7/1960 | Pickles . |
| 3,237,212 | 3/1966 | Hillenbrand et al. ........................ 5/616 |
| 3,277,736 | 10/1966 | Goodman . |
| 3,281,872 | 11/1966 | Dewey ........................................ 5/611 |
| 3,571,926 | 3/1971 | Burst .......................................... 5/616 |
| 3,628,199 | 12/1971 | Helton . |
| 3,628,200 | 12/1971 | Helton ........................................ 5/611 |
| 3,733,914 | 5/1973 | Sheesley . |
| 4,107,877 | 8/1978 | Lee . |
| 4,180,187 | 12/1979 | Ben-Haim . |
| 4,398,313 | 8/1983 | Mitchell . |
| 4,425,674 | 1/1984 | Werner . |
| 4,472,846 | 9/1984 | Volk, Jr. et al. . |
| 4,499,618 | 2/1985 | Werner . |
| 4,559,655 | 12/1985 | Peck . |
| 4,569,242 | 2/1986 | Hu . |
| 4,672,858 | 6/1987 | Langowski . |
| 4,674,349 | 6/1987 | Vouk et al. . |
| 4,759,682 | 7/1988 | Hood . |
| 4,846,011 | 7/1989 | Gaffney . |
| 4,867,295 | 9/1989 | Metcalf et al. . |
| 5,134,731 | 8/1992 | Quintile et al. . |

*Primary Examiner*—Michael F. Trettel
*Attorney, Agent, or Firm*—Greer, Burns & Crain, Ltd.

[57] ABSTRACT

A variable force clutch for use with a linear actuator power screw assembly including a threaded drive screw with a stop member secured at each end, the screw assembly used in an application apparatus having at least one cable provided with a barreled end for engaging the assembly. The clutch includes a nut configured for engagement in the bore and having a threaded interior surface for engaging the threads of the drive screw, a grooved exterior surface, upper and lower ends each having a stop lug, the nut being vertically movable resulting from axial rotation of the screw. At least one variable force clutch dog has a grooved formation for slidingly engaging the grooves on the nut, and a cable end retainer configured for securely retaining a barreled cable end. Upon a load placed upon the cable, the dog exerts a frictional force upon the nut to be moveable with the nut until the stop lug engages the stop member to stop the linear movement of the nut, the dog is configured to exert a variable clamping force on the nut, the force corresponding to the load on the cable.

19 Claims, 3 Drawing Sheets

VARIABLE FORCE CLUTCH FOR LINEAR ACTUATOR

BACKGROUND OF THE INVENTION

The present invention relates generally to linear actuators such as power screws, and more particularly to a clutch for such an actuator which is suitable for use with adjustable medical-type beds employing cables to adjust the height of the legs of the bed relative to a main bed frame.

Power screw-type linear actuators are known for use in adjustably converting rotary motion to linear motion. Such actuators typically employ an axially rotating threaded rod, upon which is engaged a slip nut attached to an application apparatus, the position of which is to be adjusted. As the rod rotates, the apparatus moves linearly. It is common in such devices to provide a clutch mechanism which protects the apparatus from damage once the end of the rod, or the limit of linear travel, is reached. Typically a spring-loaded or otherwise frictionally biased clutch is employed to allow the rod to continue to rotate, without moving the apparatus, yet not creating any stress on the system. Such systems are disclosed in U.S. Pat. Nos. 3,733,914 to Sheesley, 4,569,242 to Hu and 4,846,011 to Gaffney.

These types of linear actuator assemblies are sometimes provided in adjustable beds of the type used for clinical and home medical treatment, where the height of all or part of the bed needs to be adjustable for occupant treatment and comfort as well as assistance to the attending physician and staff. In view of the increasing tendency to shorten hospital stays, more and more noncritical patient care is being shifted to the home. Accordingly, there is a greater demand for portable adjustable beds which can be easily assembled in a home environment, and which provide at least some of the adjustability of conventional hospital beds.

Most such beds include a head end and a foot end which are substantially identical to each other, and a mattress platform which joins and is situated between the respective bed ends. Each end has a height adjustment mechanism which raises and lowers the main bed frame relative to the tops of the two legs at that end. The frame encloses the legs in slidable telescoping fashion. In one such prior art bed, a cable runs from the top of each leg, through the frame and is secured to a nut housing with a pair of spring-biased pressure plates. Such a bed is described in greater detail in U.S. Pat. No. 5,134,731 to Quintile et al., which is incorporated herein by reference.

In the '731 Patent, linear actuator, including a vertically oriented threaded rod, is used to pull on the cables and thus raise the bed, by vertically raising the nut housing through axial rotation of the threaded rod. A pair of spring-loaded pressure plates are restricted or biased against an outer surface of the slip nut to provide the necessary friction during normal operation. Once the nut housing reaches one end of the threaded rod, the engagement of the stop pins on the rod and the nut housing overcomes the spring force, allowing the nut to turn with the rod.

A clutch as just described is especially necessary in this type of bed because of the way the beds are delivered for home use. Not only are they typically disassembled, but the adjustment mechanisms of the respective head and foot ends are often not in the same position. Thus, to level the bed, the adjustment mechanisms on both ends must be terminated at the stop pins of each of the respective linear actuator rods or drive screws to achieve a level orientation.

A major drawback of this type of bed adjustment mechanism is that, due to the significant amount of force exerted by the spring-loaded pressure plates directly upon the nut, and indirectly upon the drive screw, there is a substantial load which must be overcome by the driving force which rotates the screws, be it an electric motor or a hand crank, once it reaches the stop pins. In cases where a motor is not provided, the medical technician or the patient's family members must expend significant amounts of effort in completing the leveling process. This process is exacerbated in cases when a single power source is used to drive both foot and head end actuators, and when the patient is already on the bed when levelling adjustments need to be made.

Another drawback of the bed disclosed in the '731 Patent is that the spring forces on the pressure plates must be periodically set or adjusted through the use of set screws. This arrangement is more costly to manufacture, and is tedious to maintain.

A further drawback of such conventional beds is that since the bed is typically an unfamiliar piece of furniture, the patient or family members often trip over, or bump into various portions of the bed, such as the legs, which occurs more frequently in the dark, and occurs often soon after the lights are turned off. In addition, the buttons on the bed's hand-held control or pendant device are sometimes difficult to see in the dark immediately after shutting off the lights.

Thus, there is a need for a clutch for a linear actuator, particularly one used on adjustable beds, which presents a reduced loading to the actuator mechanism and consequently is easier to adjust by hand. There is also a need for a linear actuator in such working environments which is easier to manufacture and which is adjustment-free. Lastly, there is a need for an adjustable bed which has any of its controls or projecting members, including legs, made more visible under dark conditions.

Consequently, a first object of the present invention is to provide an improved linear actuator which does not employ springs or set screws to cause the nut to move axially with the threaded rod.

Another object of the present invention is to provide an improved linear actuator which generates a relatively lower loading to the adjustment mechanism when the bed is empty.

Yet another object of the present invention is to provide an improved adjustable bed with phosphorescent accents to assist in locating the pendent for the occupant of the bed as well as attendants, and which will avoid unnecessary injuries caused by unfamiliarity with the bed, thus achieving better identification and safety.

SUMMARY OF THE INVENTION

The above-listed objects are met or exceeded by the present bed, featuring a force variable clutch in a linear actuator which requires less force to level the bed, particularly when the bed is not occupied. The present clutch features an arrangement where the cables themselves provide the pressure force, which is a function of the load on the bed, exerted upon the nut by a pair of clutch dogs. Thus the set screw-adjusted, spring-loaded pressure plates of the prior art bed are eliminated. In addition, the present bed features two instead of three grooves on the exterior of the nut for easier manufacturing and operation. Lastly, the bed's legs, crank, extremities, as well as controls are accented with a phosphorescent material to be more visible to operation in the dark.

More specifically, the present package provides a variable force clutch for use with a linear actuator power screw assembly including a threaded drive screw with a stop member secured at each end thereof, the power screw assembly used in an application apparatus having at least one cable provided with a barreled end for engaging the assembly. The clutch includes a nut housing provided with an annular bore for accommodating the drive screw, a nut configured for engagement in the bore and having a threaded interior surface for engaging the threads of the drive screw, an exterior surface provided with grooves, an upper end and a lower end each having a stop lug, the nut being secured to the housing for vertical movement resulting from axial rotation of the screw. At least one variable force clutch dog is secured in the housing, the dog having a grooved formation for slidingly engaging the grooves on the nut, and a cable end retainer configured for securely retaining the barreled end of one of the cables.

The dog is configured so that, upon a load placed upon the cable, the dog exerts a frictional force upon the nut to be axially moveable with the nut until the stop lug engages one of the stop members to stop the linear movement of the nut, the engagement generates a locking force greater than the frictional force exerted by the dog, such that the nut then moves with the screw relative to the dog, and the dog is configured to exert a variable clamping force on the nut which corresponds to the load on the cable.

DETAILED DESCRIPTION OF THE PREFERRED EMBODIMENT

Figure 1:
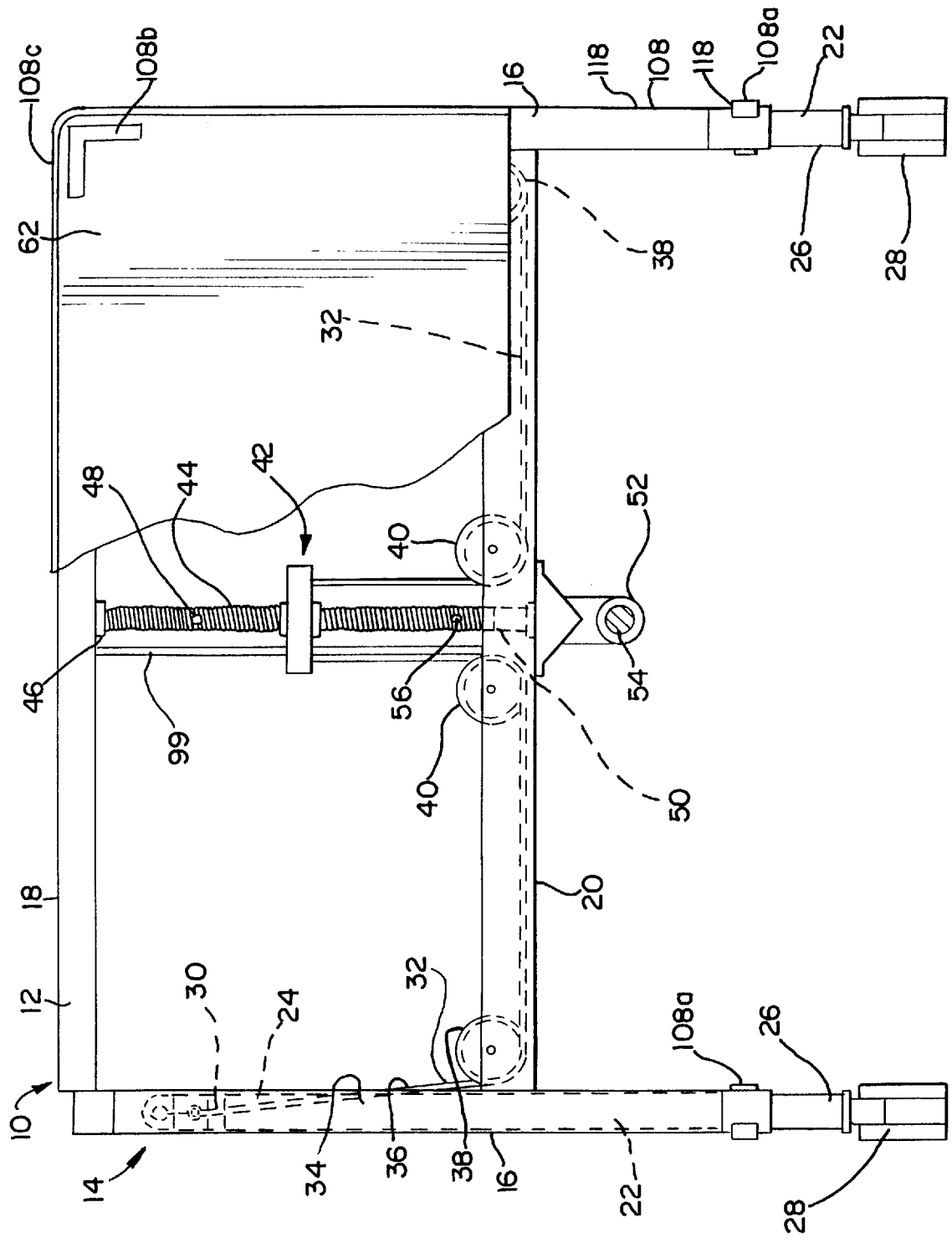
FIG. 1 is a front elevational view of an end of a bed incorporating the features of the invention.

Referring now to FIG. 1, an adjustable bed suitable for incorporation of the present clutch assembly is generally indicated at 10 and includes a head end 12, which is shown, and an opposite foot end (not shown), which is substantially identical to the head end. As such, only the head end 12 will be discussed, since the discussion applies equally to the foot end. Potential differences between the head and foot ends include the presence of a hand crank, or a motor or the absence of a variable force clutch mechanism as will be described below.

Included on the head end 12 is a main frame 14 including a pair of leg tubes 16 secured together in spaced relationship by upper and lower crossmembers, respectively designated 18 and 20. The frame 14 is preferably fabricated of pieces of square steel tubing welded together, however other equivalently durable and load bearing materials are contemplated.

Telescopingly and slidingly inserted into each of the leg tubes 16 is a leg 22 having an upper end 24 and a lower end 26. The leg 22 is preferably made of tubular steel or equivalent material which is comparable to the material used for the main frame 14. At the lower end 26 is disposed a caster 28 which allows the bed 10 to be easily moved about the floor. Opposite the caster 28, a first end 30 of a bed end cable 32 is attached to the upper end 24, such as by a pin and loop fastener attachment or equivalent fastener as is known in the art.

Figure 2:
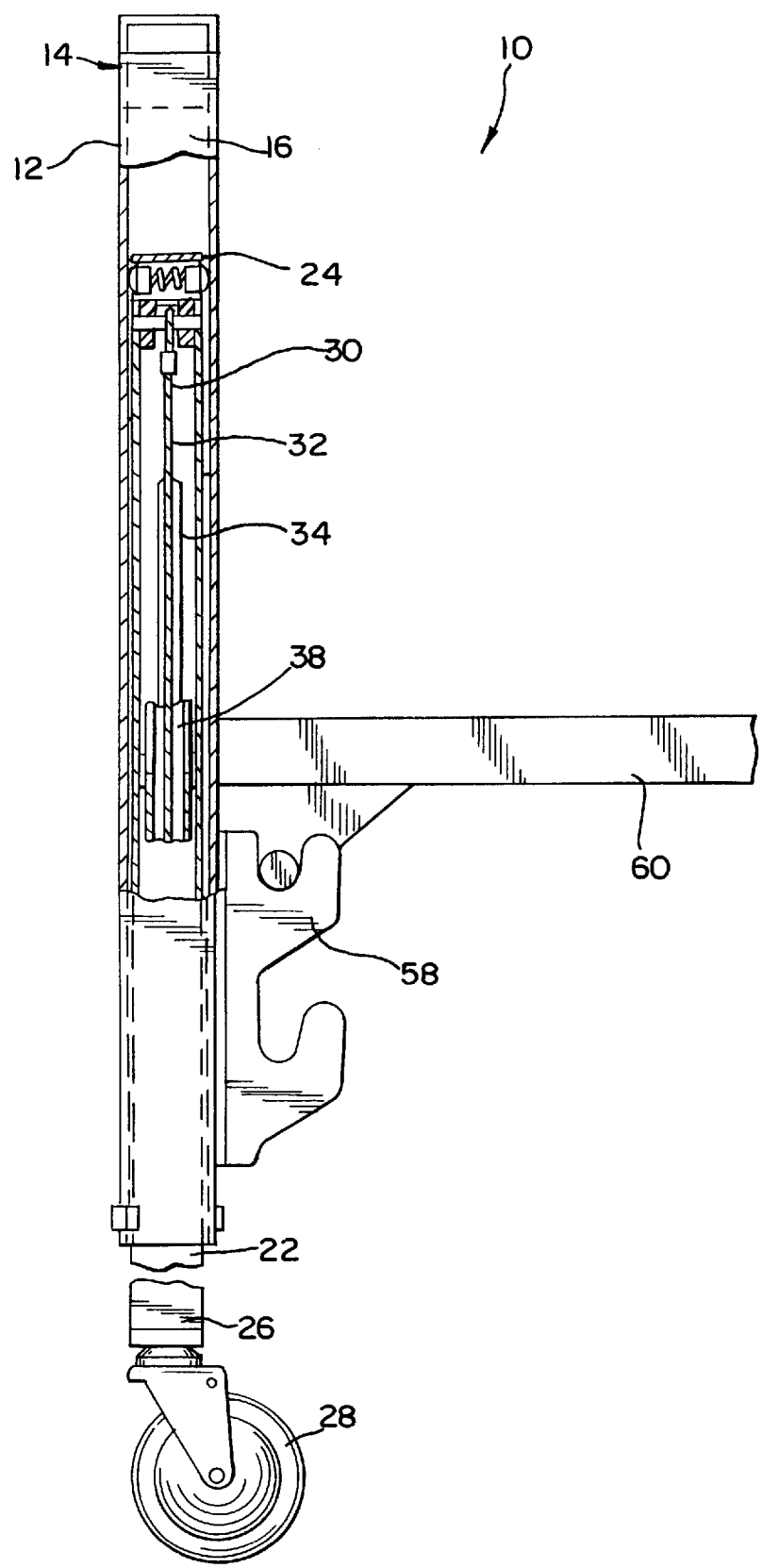
FIG. 2 is a fragmentary side view of the bed depicted in FIG. 1.

Referring now to FIGS. 1 and 2, upon attachment to the upper end 24 of the leg 22, the cable 32 is passed through corresponding slotted openings 34, 36 in the side of the leg 22 and in the leg tube 16. The cable 32 is then fed around an outer pulley 38 and an inner pulley 40 where it is then attached to a nut housing 42. The nut housing 42 encloses the present variable force clutch assembly. Situated in the main frame 14, the nut housing 42 is threadedly engaged by its internal components upon a threaded, vertically disposed drive screw 44, which is journalled for axial rotation with respect to the main frame 14 at an upper end 46, and is also provided with an upper stop pin 48 transversely fixed in the screw.

Opposite the upper end 46, a lower end 50 of the screw 44 is also configured for rotation relative to the main frame 14, and is connected through a pair of miter gears (not shown) located in a gearbox 52 to a drive shaft 54. The drive shaft 54 may be powered by an electric motor (not shown) or by a hand crank (not shown). In the preferred embodiment, the bed 10 is provided with both a motor and a hand crank in the event of motor or power failure. Also provided to the lower end 50 of the screw 44 is a lower stop pin 56 transversely fixed in the screw.

Referring now to FIG. 2, each of the head and foot ends includes a bracket 58 located on each of the leg tubes 16 which is configured to engage a mattress support platform 60 (shown fragmentarily). The support platform 60 may be separable in its mid section (not shown) and supports a mattress (not shown) and also connects the head and foot ends to create the bed 10.

It will be evident from FIG. 1, that as the screw rotates axially, the nut housing 42 will move vertically, taking with it the cables 32. Thus, as the housing 42 moves upward, the bed 10 will be raised, and as it moves downward, the bed will be lowered. It is preferred that the main frame include a pair of protective shield panels 62 (at least one on each side of the frame 14) to protect the patient and operators from becoming injured by bed mechanism components.

Figure 3:
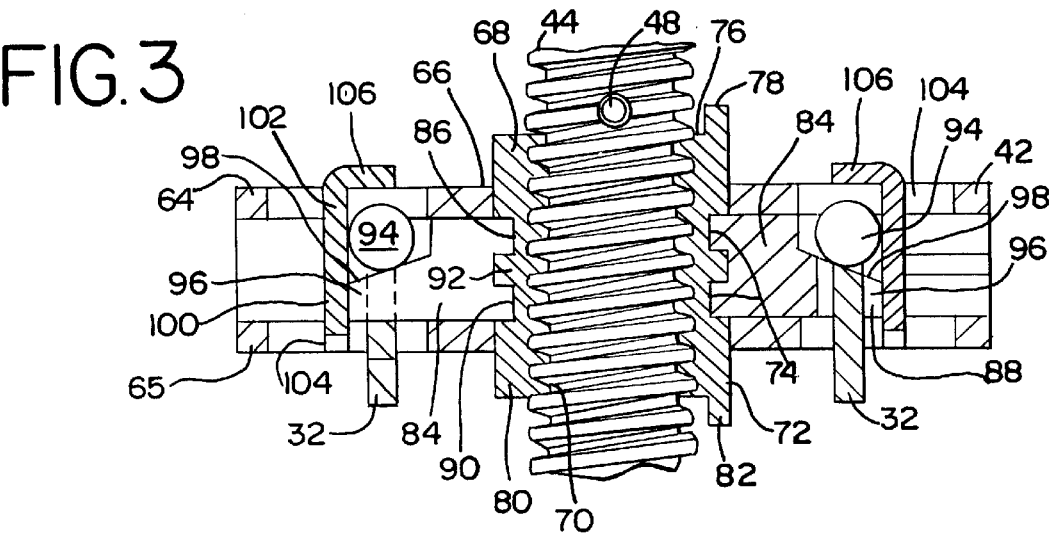
FIG. 3 is a vertical sectional view of the clutch assembly of the present invention.
Figure 4:
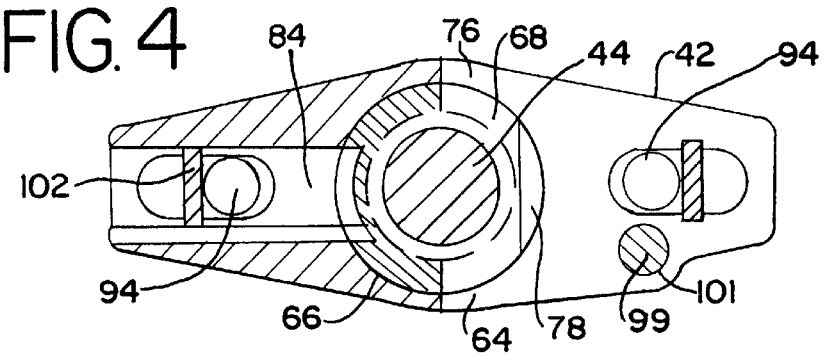
FIG. 4 is an overhead plan view of the clutch assembly depicted in FIG. 3.

Referring now to FIGS. 3 and 4, the structure and operation of the nut housing 42 will be described in greater detail. The nut housing 42 has an upper end 64 and a lower end 65, which correspond to the ends 46, 50 of the drive screw 44. A generally centrally located annular bore 66 is dimensioned to accommodate the drive screw 44 as well as a nut 68.

The nut 68 is generally tubular in shape and has a threaded interior surface 70 which is configured to threadedly engage the drive screw 44. An exterior surface 72 of the nut 68 is provided with at least one and preferably two or more vertically spaced, parallel annular grooves 74. An upper end 76 of the nut 68 is provided with a stop formation or lug 78, and a lower end 80 of the nut is also provided with a similar stop formation or lug 82.

In the preferred embodiment, the nut 68 is manufactured as a single piece in which the stop formations or lugs 78, 82 are integrally formed. It is of course contemplated that the formations 78, 82 may also be provided as separate pins which are fixed within corresponding bores (not shown) as are well known in the art.

Also included in the nut housing 42 is at least one and preferably two variable force clutch dogs 84 secured in the housing between the upper and lower ends 64, 65 and having an inner end 86 and an outer end 88. It is contemplated that a clutch dog 84 will be provided for each cable 32. The inner end 86 is provided with at least one and preferably a pair of upper and lower lugs 90 separated by a groove 92 therebetween which provide a mating relationship with the exterior grooves 74 of the nut 68. The resulting clutch apparatus, which includes the nut housing 42, the nut 68 and the dogs 84, and receives its force from the cables 32, is more reliable in operation than conventional linear actuator clutches of the type used on adjustable beds.

Opposite the inner end 86, the outer end 88 of the clutch dog 84 is configured as a cable end retainer for securely retaining a barreled end 94 of the cable 32. The term "barreled end" refers to any formation, including a spherical or cylindrical cable end, which is secured to the end of a cable to lock it in position and/or to prevent unraveling of the individual cable strands. In the preferred embodiment, the outer end 88 has a laterally opening slot 96 which is narrow enough to receive the cable 32 but is narrower than the barreled end 94.

Another feature of the dog 84 is that the outer end 88 is provided with a ramped or inclined surface 98 which inclines upward toward the inner end 86. The precise angle of inclination is a function of the weight of the bed, the tolerances of the clutch assembly, the fit of the parts and the degree and type of lubrication employed. In the preferred embodiment, the angle of inclination of the ramp is in the range of 20° to 30° from horizontal, however other angles are contemplated depending on the above-listed factors.

Thus, the ramped surface 98 defines a space in the nut housing 42 for the barreled cable end 94 which narrows toward the inner end 86. It has been found that the angled shape of the ramp, upon which the barreled end 94 rests, in addition to retaining the barreled end on the dog 84, at the same time exerts or imparts a frictional clamping force directed generally normally to the longitudinal axis of the drive screw 44. This frictional clamping force ensures that sufficient friction is created between the dogs 84 and the nut 68 so that the dogs, and their cables 32, will be moved vertically with the nut housing 42 when the drive screw 44 rotates. To prevent the entire nut housing 42 from rotating relative to the screw 44, a vertical guide rod 99 (best seen in FIG. 1) which is disposed in a parallel relationship to the screw 44. The rod 99 is fixed at its upper and lower ends to the corresponding upper and lower crossmembers 18 and 20. A corresponding vertical throughbore 101 (best seen in FIG. 4) in the nut housing 42 slidingly receives the rod 99.

Another feature of the ramped configuration of the dogs 84 is that the cables generate a variable clamping force depending on the amount of load on the bed 10. This clamping force has both a vertical and a horizontal component which creates the desired clamping force. When the bed is first assembled, and without any bedding or patient, there is a relatively light load on the cables 32, and less clamping force needs to be overcome in turning the drive screw 44. In applications where a single drive force (motor or human powered) controls both head and foot end drive screws, this relatively light loading allows the nut housings 42, including the nuts 68 and dogs 84, to be axially displaced on the drive screw at their upper or lower limit points with relatively little effort expended.

This limit point is achieved when the stop formations 78, 82 on the nut 68 encounter the corresponding stop member or pin 48, 56. As weight is added to the bed 10, the cable 32 exerts greater bias on the dogs 84, which in turn exert a greater friction or clamping force on the nut 68. In any event, once the limit point is reached, the force from the engaged stop members and the stop formations is greater than that between the dogs 84 and the nut 68, which results in the nut spinning with the drive screw 44 relative to the nut housing 42 to create a clutch action.

Also shown in FIGS. 3 and 4 is a supplemental retaining device 100 for retaining the barreled end 94 of the cable 32 in the nut housing 42. The device 100 takes the form of a generally "L"-shaped clip having a first or longer leg 102 slidably inserted in an aperture or slot 104 in the nut housing 42. Once installed, the leg 102 contacts the barreled cable end 94. A second or shorter leg 106 covers the barreled cable end 94 and prevents axial movement of the cable 32 toward the upper end 76 of the nut 68. An important function of the clip 100 in the present clutch assembly is that it retains the barreled cable end 94 in position on the ramped surface 98 of the clutch dog 84.

Figure 5:
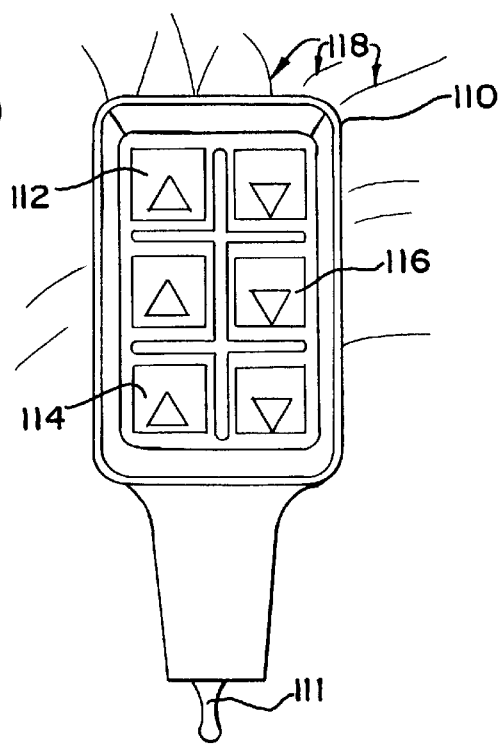
FIG. 5 is a front elevational view of a control pendant suitable for use with the present bed and clutch assembly.

Referring now to FIGS. 1 and 5, an optional feature of the present bed 10 relates to the problem of users tripping over or bumping into portions of the bed in the dark. To alleviate this problem, each leg 22 and any other potentially dangerous bed extremities, are provided with a clip, decal or ring, respectively 108a, 108b, 108c (best seen in FIG. 1) which is incorporated with a phosphorescent pigment. In the preferred embodiment, the clip 108a is made of injection molded plastic into which the pigment is incorporated. Thus, when the bed is exposed to the light, the phosphorescent members 108a–c will store light, which will then be visible once the bed is in a darkened room.

In addition, referring now to FIG. 5, when the bed is adjusted electronically through the use of a motor which drives the drive shaft 54 for both head and foot ends, a pendant or controller 110 is provided for user control of the bed's functions. Although one configuration of pendant 110 is depicted, it is contemplated that other exterior shapes may be employed, such as those being ergonomically designed to fit comfortably in the operator's hand. The pendant 110 is connected to the drive source through a cord 111 (shown fragmentarily) as is known in the art. On the pendant 110 there are buttons for the head end 112 (UP and DOWN), for the foot end 114 (UP and DOWN) and for the entire bed 116 (UP and DOWN). It is also contemplated that the housing of the pendant 110 is coated with phosphorescent paint or is molded of plastic incorporating the same type of phosphorescent pigment, which is well known in the art and indicated by the lines 118. Alternatively, the pendant 110 may be provided with self-adhesive phosphorescent tape.

In operation, upon attachment of the head and foot ends to the mattress platform 60, the bed 10 must be leveled. This is necessary due to the fact that in the course of shipment, or through prior use, the head and foot ends may have their respective nut housings 42 at different relative positions. To reach a level orientation, both of the nut housings 42 are advanced to the same one of the upper or lower limits by engaging the respective stop pin 48, 56. Whichever nut housing reaches the stop pin first will have its nut 68 begin spinning with the drive screw 44 relative to the nut housing 42. This will preserve the drive train from damage while the remaining nut housing reaches the desired limit. In some cases, for a short period of time, the nuts 68 of both bed ends will be spinning relative to the respective drive screws 44 until the user is satisfied that the bed is level. In some cases, only one end of the bed 10 will have the present variable force clutch mechanism incorporated in the nut housing 42 and used with the screw 44 and the cables 32. Such an arrangement still allows for self-leveling of the bed assembly.

Thus, the present variable force clutch assembly provides a simple, yet energy efficient mechanism for adjusting a linear actuator, and specifically an adjustable bed as the application apparatus. The clutch dogs receive their clamping power from the very cables they are using to adjust the height of the bed, instead of from elaborate spring assemblies as taught by the prior art. In addition, the present clutch assembly conserves motor and/or operator energy by providing a lighter loading, or exerting a lighter force, when the bed is not loaded, and the mechanism is in the stop-pin position at either end of the respective screw 44. Weaker operators can now manually self-level the bed, for example in a home care environment, and when motorized, the life of the motor and related power transmission components will be extended. In addition, phosphorescent components are provided to minimize patient and operator injury.

While a particular embodiment of the variable force clutch for a linear actuator of the invention has been shown and described, it will be appreciated by those skilled in the art that changes and modifications may be made thereto without departing from the invention in its broader aspects and as set forth in the following claims.

What is claimed is:

1. A variable force clutch for use with a linear actuator power screw assembly including a threaded drive screw with a stop member secured at each end thereof, the power screw assembly used in an application apparatus having at least one cable provided with a barreled end for engaging the assembly, said clutch comprising:

a nut housing provided with an annular bore for accommodating said drive screw;

a nut configured for engagement in said bore and having a threaded interior surface for engaging the threads of the drive screw, an exterior surface provided with grooves, an upper end and a lower end each having a stop lug, said nut being secured to said housing for vertical movement resulting from axial rotation of said screw;

at least one variable force clutch dog secured in said housing, said dog having a grooved formation for slidingly engaging said grooves on said nut, and a cable end retainer configured for securely retaining the barreled end of one of the at least one cable;

said dog being configured so that, upon a load placed upon the cable, said dog exerts a frictional force upon said nut to be moveable with said nut axially relative to said screw until said stop lug engages one of the stop members to stop the linear movement of said nut, said engagement generating a locking force greater than said frictional force exerted by said dog, such that said nut then moves with said screw relative to said dog; and said dog being configured to exert a variable clamping force on said nut, said force corresponding to the load on the cable.

2. The clutch as defined in claim 1 wherein each said clutch dog has an inner end provided with said grooves, and an outer end provided with said cable end retainer.

3. The clutch as defined in claim 2 wherein said cable retainer has a ramped surface which is angled to create a space in said housing for the barreled cable end which narrows toward said inner end.

4. The clutch as defined in claim 1 further including supplemental retaining means for retaining the barreled end of said cable in said housing.

5. The clutch as defined in claim 4 wherein said supplemental retaining means includes a generally "L"-shaped bracket having one leg configured for being slidingly inserted into a corresponding opening in said housing and contacting an outer end of said cable retainer.

6. The clutch as defined in claim 5 wherein said supplemental retaining means includes another leg configured for preventing axial movement of the cable toward said upper end of said nut.

7. The clutch as defined in claim 2 including a pair of cables on the application apparatus, and two of said dogs, one for each cable.

8. An end of an adjustable bed having two identical such ends designated the head end and the foot end, said end comprising:

a pair of legs each telescopingly slidably inserted in said end;

a drive screw having threads and being vertically oriented on said bed end, having upper and lower stop pins, and being axially rotatable relative to said end;

a nut housing provided with an annular bore for accommodating said drive screw;

a pair of bed end cables connecting upper ends of said legs with said nut housing, each said cable having a barreled end for engaging said nut housing;

a nut configured for engagement in said bore, having a threaded interior surface for engaging threads of said drive screw, an exterior surface provided with grooves, an upper end having a stop lug, and a lower end having a stop lug, said nut being attachable to said housing for vertical movement resulting from axial rotation of said screw;

a variable force clutch dog secured in said housing, one such dog provided for each said cable, said dog having a grooved formation for slidingly engaging said grooves on said nut, and a cable end retainer configured for securely retaining said barreled end of said cable;

said dog being configured so that, upon assembly of said bed to create a load on said cable, said dog is moveable with said nut relative to said screw until said stop lug engages one of the stop members to stop the linear movement of said nut and said housing, said nut then moves with said screw relative to said dog and said housing; and said dog being configured to exert a clamping force on said nut which corresponds to the load on said cable.

9. The bed end as defined in claim 8 wherein each said clutch dog has an inner end provided with said grooves, and an outer end provided with said cable end retainer.

10. The bed end as defined in claim 9 wherein said cable retainer has a ramped surface which is angled to create a space in said housing for the barreled cable end which narrows toward said inner end.

11. The bed end as defined in claim 8 wherein said bed end is provided with phosphorescent indicators for preventing unwanted contact with users.

12. The bed end as defined in claim 8 further including supplemental retaining means for retaining the barreled end of said cable in said housing.

13. The bed end as defined in claim 12 wherein said supplemental retaining means includes a generally "L"-shaped bracket having one leg configured for being slidingly inserted into a corresponding opening in said housing and contacting an outer end of said cable retainer.

14. The bed end as defined in claim 13 wherein said supplemental retaining means further includes another leg configured for preventing axial movement of the cable toward said upper end of said nut.

15. An adjustable bed, comprising:

a head end having a pair of head end legs telescopingly inserted therein;

a foot end having a pair of foot end legs telescopingly inserted therein;

a generally planar mattress-bearing platform extending between and supported by said head end and said foot end;

a pair of drive screws, one said screw associated with each of said head end and said foot end, each said drive screw being threaded and vertically oriented on said bed, having upper and lower stop pins, and being constructed and arranged for axial rotation relative to said respective end;

a pair of nut housings, one such housing provided with an annular bore for accommodating a corresponding one of said drive screws;

a pair of bed end cables connecting upper ends of said foot end legs with said corresponding nut housing for at least one of said head end, and said foot end each said cable having a barreled end for engaging said nut housing;

a nut in each nut housing configured for engagement in said bore, having a threaded interior surface for engaging threads of said drive screw, an exterior surface provided with grooves, an upper end having a stop lug, and a lower end having a stop lug, said nut being attachable to the housing for vertical movement resulting from axial rotation of said corresponding screw;

a variable force clutch dog secured in said housing, one such dog provided for each said cable, said dog having a grooved formation for slidingly engaging said grooves on said nut, and a cable end retainer configured for securely retaining said barreled end of a corresponding one of said cables;

said dog being configured so that, upon assembly of said bed to create a load on said cable, said dog is moveable with said nut relative to said screw until said stop lug engages one of the stop members to stop the linear movement of said nut and said housing, said nut then moves with said screw relative to said dog and said housing; and said dog being configured to exert a clamping force on said nut which corresponds to the load on said cable.

16. The bed as defined in claim 15 wherein said cable retainer has a ramped surface which is angled to create a space in said housing for the barreled cable end which narrows toward said inner end.

17. The bed as defined in claim 15 wherein at least one of said legs is provided with phosphorescent marking.

18. The bed as defined in claim 15 wherein said phosphorescent marking takes the form of a ring secured on the appropriate portion of the bed.

19. The bed as defined in claim 15 further including a control pendant which is provided with phosphorescence.

* * * * *